Figure 1:
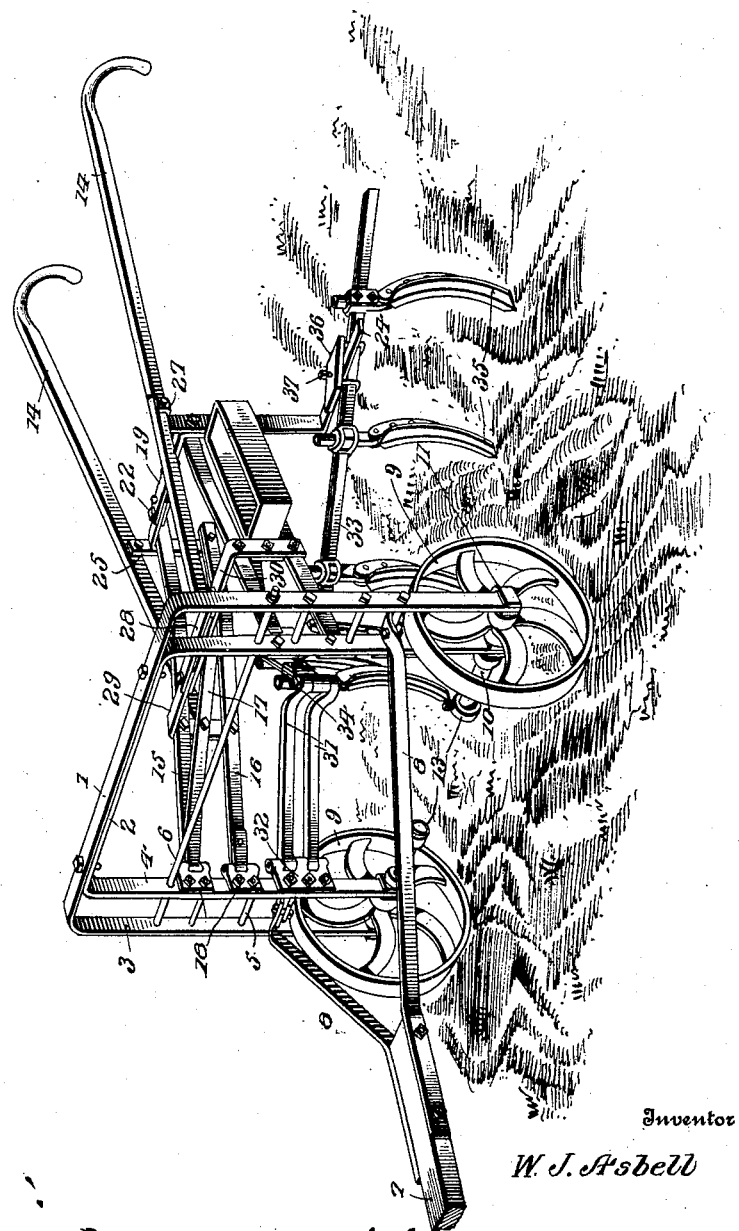

W. J. ASBELL.
CULTIVATOR.
APPLICATION FILED JAN. 6, 1908.

909,512.

Patented Jan. 12, 1909.

3 SHEETS—SHEET 1.

Witnesses

Inventor
W. J. Asbell

By ____, Attorneys

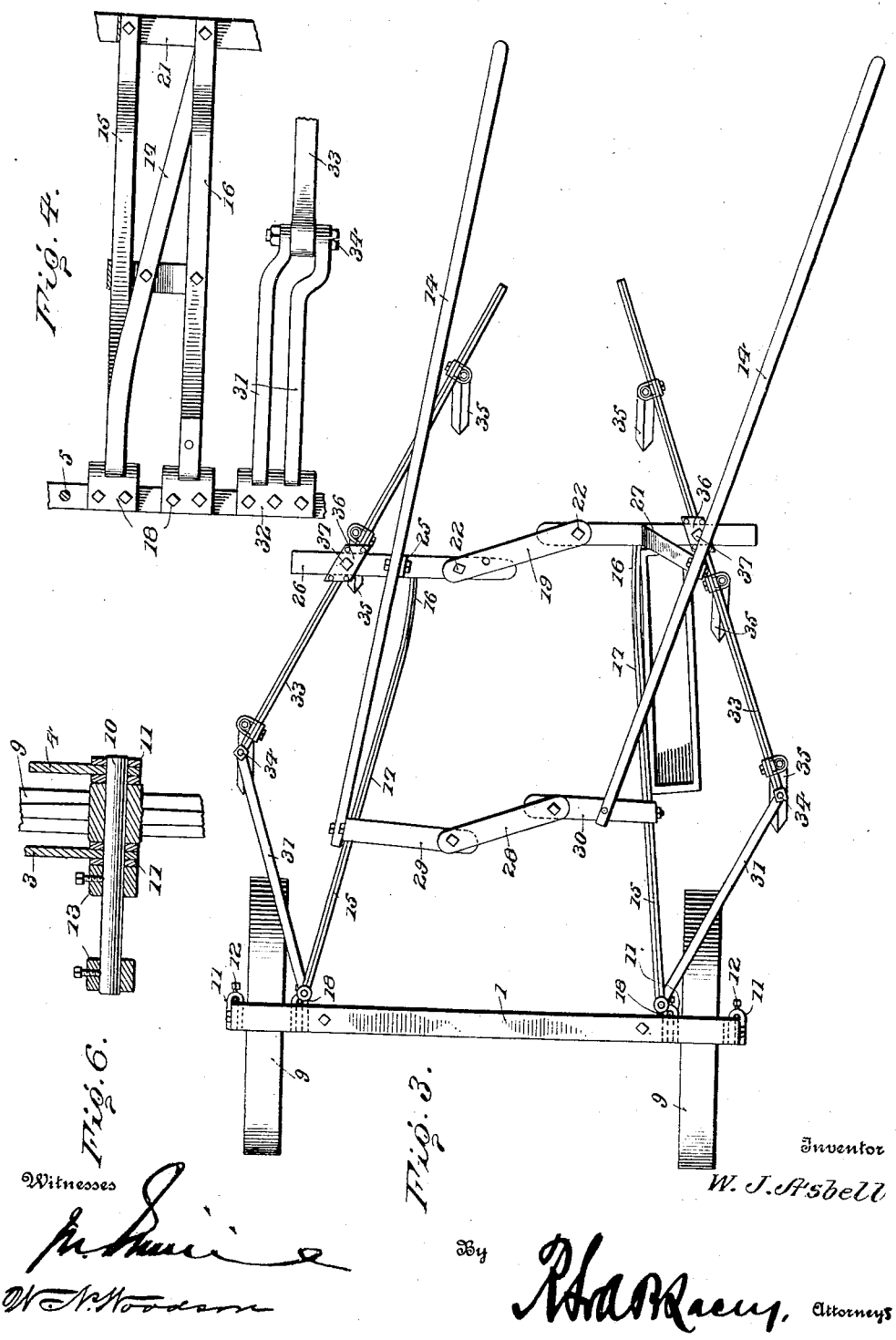

W. J. ASBELL.
CULTIVATOR.
APPLICATION FILED JAN. 6, 1908.
909,512.
Patented Jan. 12, 1909.
3 SHEETS—SHEET 3.
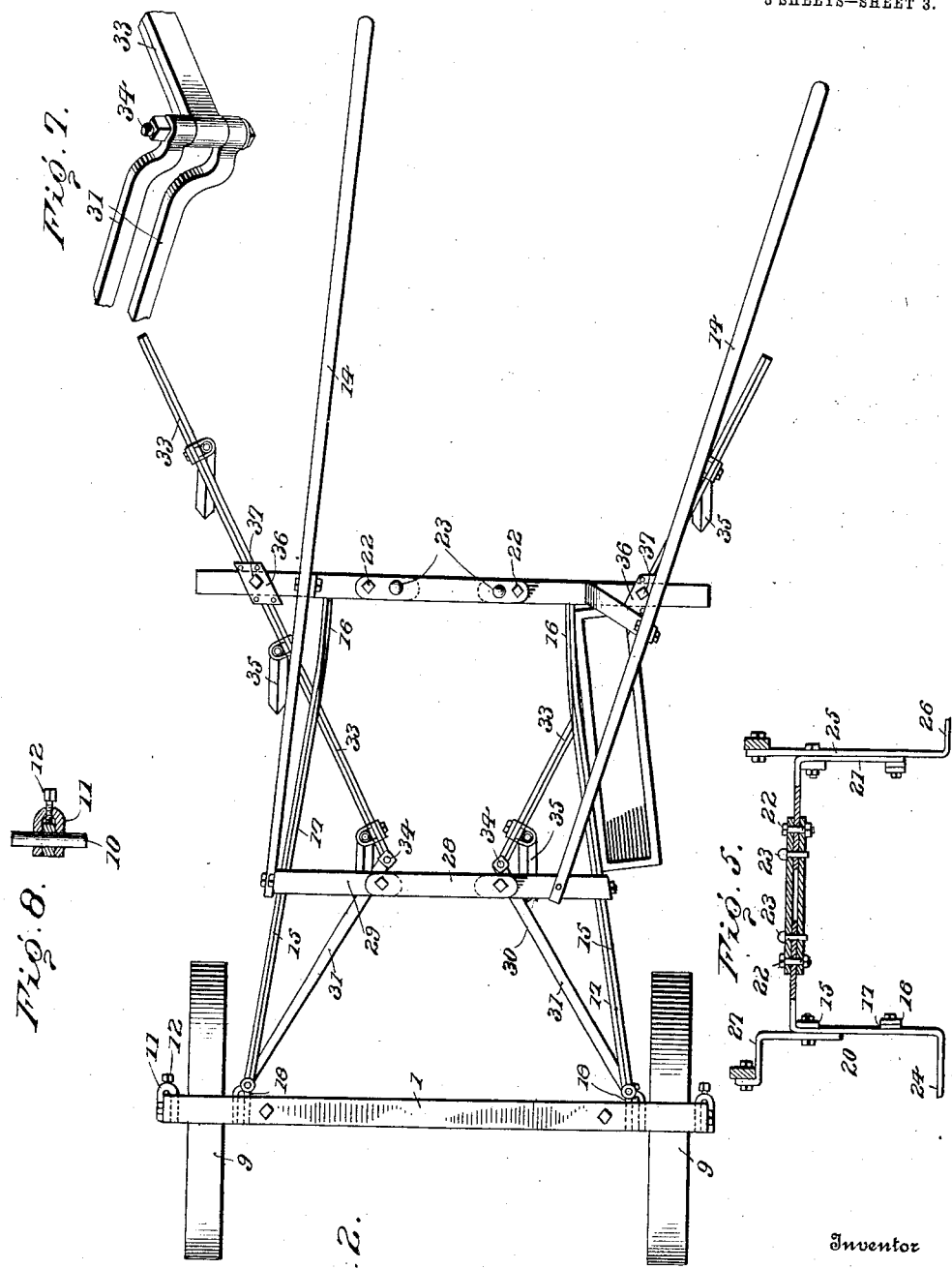
Witnesses
Inventor
W. J. Asbell
By
Attorneys

UNITED STATES PATENT OFFICE.

WILLIAM J. ASBELL, OF BELVIDERE, NORTH CAROLINA.

CULTIVATOR.

No. 909,512.     Specification of Letters Patent.     Patented Jan. 12, 1909.

Application filed January 6, 1908. Serial No. 409,526.

*To all whom it may concern:*

Be it known that I, WILLIAM J. ASBELL, citizen of the United States, residing at Belvidere, in the county of Perquimans and State of North Carolina, have invented certain new and useful Improvements in Cultivators, of which the following is a specification.

The present invention appertains to machinery for use in the field for cultivating plants, the purpose being to provide a framework of novel formation and susceptible of adjustment, whereby the same may be adapted to meet varying conditions both of soil and work. The framework of the machine embodies an arch for straddling the row of plants to be cultivated, ground wheels for supporting said arch and adjustable to admit of varying the distance between them according to the space between the rows of plants to be tilled, frames pivoted or hinged to the vertical members of the arch so as to swing horizontally and having the handle bars attached thereto, said frames being connected by sectional ties, whose members are connected to admit of the sections pivoting or being held rigid, and side bars provided with cultivator teeth, shovels or the like and comprising sections pivoted to one another and to the arch, whereby said bars may be adjusted and at the same time move so as to clear the plants and obviate injury thereto.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a cultivator embodying the invention. Fig. 2 is a top plan view of the cultivator, showing the side bars arranged to break joint inward and the handle bar frames held rigid against lateral movement, the hounds being omitted. Fig. 3 is a view similar to Fig. 2, the side bars being arranged to break joint outward, and the handle bar frames being free to move so as to clear the plants and prevent injury thereto, the hounds being omitted. Fig. 4 is a side view of a portion of the arch and the handle bar frame and side bar pivoted thereto. Fig. 5 is a transverse section on the line 5—5 of Fig. 2, looking towards the front, parts being omitted. Fig. 6 is a sectional view of a member of the arch, showing more clearly the clip for securing the axle in an adjusted position. Fig. 7 is a detail perspective view of the pivoted ends of the parts comprising a side bar. Fig. 8 is a horizontal section of a clip and a member of the arch, showing the manner of connecting them to the axle, a portion of the latter being shown in full lines.

Corresponding and like parts are referred to in the following description and indicated in all the views of the drawings by the same reference characters.

The main frame comprises an arch, which in the preferable construction consists of an inner arch and an outer arch, the horizontal member 1 of the outer arch resting upon the horizontal member 2 of the inner arch and bolted or otherwise secured thereto. The vertical members 3 of the outer arch are transversely spaced from the vertical members 4 of the inner arch, the two members 3 and 4 being connected by means of a series of pins 5 and a rod 6, the latter connecting the four members, that is, the two upon one side with the two upon the opposite side. The pins 5 and rods 6, besides connecting the members of the arches, also provide for adjustable connection to the arch of the pole or tongue 7, the hounds 8 of which are adapted to be fitted to corresponding pins and secured thereto. Ground wheels 9 support the arch and each is mounted upon an axle 10 which is fitted in openings formed in the lower ends of the members 3 and 4. A clip 11 secures the axle 10 to each member of the arch, the clip being of U-form and embracing opposite sides of the member of the arch to which fitted and having openings in its members for the axle 10 to pass through. A set screw 12 threaded into the opening formed in the closed end of the clip, engages with the edge of the member 3 or 4 and serves to cause the clip to bind upon the axle and hold the same in the adjusted position. The ground wheels 9 may be arranged between the members 3 and 4 of the arch or upon the inner or the outer side of said members according to the position of the axles. As shown in Fig. 1, the axles 10 are arranged to project inward from the vertical members of the arch, but upon loosening the set screws 12 of the clips 11, the axles may be adjusted to project outward from said members, as indicated in Fig. 3. Set collars 13 are mounted upon the projecting ends of the axles to engage with the ends of the hubs of the ground wheels and hold the latter in the adjusted position.

The handle bars 14 have connection with frames pivoted or hinged to the vertical members of the arch so as to swing horizontally. Each handle bar frame consists of an upper bar 15, a lower bar 16 and a brace 17, the latter forming an integral part of the bar 15, the two parts 15 and 17 being formed by doubling a bar upon itself, an eye being formed at the fold to receive the pin forming the axis about which the bar 15 turns. Plates 18 are secured to the vertical members of the arch and the bars 15 and 16 are pivoted or hinged thereto. The handle bar frames are connected by similarly formed ties. The rear tie consists of a middle section 19 and end sections 20 and 21. The middle section 19 comprises companion members which are spaced apart and arranged to embrace upper and lower sides of the horizontal portions of the sections 20 and 21 and pivoted thereto by means of fastenings 22. Pins 23 are adapted to be passed through registering openings in the overlapped ends of the parts 19, 20 and 21 to secure the same against pivotal movement when a rigid frame is required, as indicated in Figs. 2 and 5. When the pins 23 are withdrawn, the parts 19, 20 and 21 are free to move upon the pivot fastenings 22, as indicated most clearly in Fig. 3. The parts 20 and 21 have vertical portions which are connected to the bars 15 and 16 of the handle bar frames.

The part 20 has an outer arm 24 to which one of the bars provided with the cultivator teeth or shovels, is attached. A bar 25 is secured to the vertical portion of the part 21 and projects above and below the same and is provided at its lower end with a horizontal arm 26 to which the other toothed carrying bar is attached. One of the handle bars 14 is secured to the upper projections of the bar 25. A bracket 27 is secured to the part 20 and has the other handle bar connected thereto. The intermediate tie connecting the handle bar frames consists of a middle part 28 and end parts 29 and 30, the several parts being pivotally connected at their inner overlapped ends. The outer bars 29 and 30 have their outer ends bent downwardly and lapped alongside the handle bar frames and connected thereto. The lower front ends of the handle bars 14 are connected to the parts 29 and 30.

The side bars receiving the cultivator teeth or shovels are pivoted or hinged at their front ends to the vertical or side members of the arch so as to swing horizontally and each side bar is composed of two sections which are pivotally connected to break joint inward, as shown in Fig. 2, or to break joint outward, as indicated in Fig. 3. The front section of each side bar consists of companion members 31 which are vertically spaced and pivoted or hinged at their front ends to a plate 32 attached to a member of the arch. The rear section of the side bar consists of a single member 33 which is arranged between the rear ends of the members 31 and pivoted thereto by a suitable fastening 34. The member 33 is adapted to receive the cultivator teeth or shovels 35 which may be of any design, pattern or make according to the nature of the soil to be tilled and the variety of plants to be cultivated. The rear sections or members 33 of the side bars have adjustable connection with the laterally extended arms 24 and 26, whereby the angle between the members 31 and 33 may be regulated, whereby said members may be held in alinement or secured, whether the joint is broken inward or outward according to the character of the work. Clips 36 adjustably connect the members 33 to the respective arms 34 and 26, said clips being tightened by means of a set screw 37 and each clip consisting of a plate and bows, the latter embracing the members 33 upon opposite sides of the arms to which they are attached. When the pins 23 are withdrawn and the machine is moved over the field, the side bars provided with the teeth or shovels may be moved laterally by proper manipulation of the handle bars 14. Should it be required to secure the handle bar frames and the bars provided with the teeth, so as to prevent lateral movement thereof, the pins 23 are placed in position with the result that the framework is made rigid. The handle bar frames and the bars provided with the teeth or shovels, are connected so as to swing horizontally, but are prevented from vertical movement independently of the arch, the whole frame being adapted to tilt upon the axles 10, whereby the teeth or shovels may be either lifted from the ground or caused to penetrate the same to a greater or less depth. By varying the point of attachment of the hounds 8 with the arch, the draft may be utilized both to move the implement over the field as well as to lessen the weight upon the handle bars, it being understood that the draft tends to swing the upper part of the arch forward and to lift the rear part of the frame and the teeth or shovels carried thereto. The inclination of the members 33 provided with the teeth or shovels may be varied by adjustably connecting them to the laterally extended arms of the parts 20 and 25, as will be readily understood.

From the foregoing it will be understood that the implement is susceptible of a variety of adjustments and adapted to be readily controlled and that the draft may be applied to relieve the operator wholly or in part of the weight of the machine, thereby preventing the fatigue experienced in the handling of implements of the general type and for the work intended to be accomplished by the present machine.

Having thus described the invention, what is claimed as new is:

1. In an implement of the character specified, the combination of an arch, axles mounted in openings in the members of the arch and movable longitudinally therein, clips embracing opposite sides of the members of the arch and having openings for the passage of the axles, set screws threaded into openings of the clips for tightening the same and securing the axles in the adjusted position, ground wheels adjustable upon said axles, and cultivating devices having connection with the said arch.

2. In combination, an arch having its vertical or side members composed of transversely spaced bars, axles mounted in openings provided in said bars and longitudinally adjustable, clips for securing the axles to the bars in the required adjusted position, ground wheels mounted upon the axles and adapted to be fitted upon either end of the axles or arranged between the spaced members comprising the side members of the arch, set collars mounted upon the axle for securing the ground wheels when mounted upon the end portions thereof, and cultivating devices having connection with the said arch.

3. In combination, an arch having each vertical portion formed of transversely spaced members, ground wheels fitted to the lower ends of the vertical portions of the arch, pins connecting companion members of the arch at different elevations, cultivating devices having connection with the vertical portions of the arch, and a draft appliance adapted to be connected to any selected pins.

4. In combination, an arch, horizontally swinging bars pivotally connected to the vertical members of the arch and provided with cultivator teeth, horizontally swinging handle bars, front and rear connections between the said horizontally swinging bars and comprising laterally adjustable parts, the handle bars having pivotal connection at their lower ends with the said front connections, and other means connecting the handle bars with the said rear connections.

5. In combination, an arch, horizontally swinging toothed bars pivoted to the side members of the arch, front and rear laterally adjustable connections between the said toothed bars, said handle bars having pivotal connection at their forward ends with members of said front connection, and other vertically adjustable connections between the handle bars and the said rear connections.

6. In an implement of the character specified, the combination of a supporting frame, bars pivoted to the frame to swing horizontally, each bar comprising pivoted sections adapted to break joint inward or outward or to be alined, cultivator teeth fitted to said pivoted bars, handle bars having horizontal arms, and means adjustably connecting the rear sections of the pivoted bars with the said horizontal arms.

7. In combination, a supporting frame, bars pivoted to said frame, each composed of a front section and a rear section, the front section consisting of vertical spaced members and the rear section consisting of a single member pivoted between the rear ends of the members of the front section, cultivator teeth mounted upon the rear sections of the bars, handle bars having connection with the said frame to swing horizontally, horizontal arms having connection with the handle bars, and means adjustably connecting the rear sections of the aforesaid bars with the horizontal arms.

8. In combination, a supporting frame, toothed supporting bars pivoted to said frame, each consisting of pivoted sections, handle bars having horizontal arms, frames supporting said handle bars and pivoted to the supporting frame, means adjustably connecting said horizontal arms with the rear sections of the toothed supporting bars, and a sectional connection between the handle bar frames and comprising a middle and end sections pivotally connected, and means for securing said sections to render the machine rigid when required.

In witness whereof I affix my signature in presence of two witnesses.

WILLIAM J. ASBELL. [L. S.]

Witnesses:
V. B. HILLYARD,
W. N. WOODSON.